(12) United States Patent
Gross et al.

(10) Patent No.: US 7,461,793 B2
(45) Date of Patent: Dec. 9, 2008

(54) SECURE PASSIVE TAGGING SCHEME

(75) Inventors: Kenneth Clayton Gross, San Diego, CA (US); Ramakrishna C. Dhanekula, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 309 days.

(21) Appl. No.: 11/298,959

(22) Filed: Dec. 9, 2005

(65) Prior Publication Data

US 2007/0131779 A1 Jun. 14, 2007

(51) Int. Cl.
*G06K 19/06* (2006.01)

(52) U.S. Cl. .................. 235/494; 235/487; 235/375

(58) Field of Classification Search ............ 235/494, 235/487, 380, 385, 375, 383
See application file for complete search history.

(56) References Cited

U.S. PATENT DOCUMENTS

| | | | |
|---|---|---|---|
| 3,632,470 | A | 1/1972 | Rubin et al. |
| 4,495,143 | A | 1/1985 | Gross et al. |
| 5,333,157 | A | 7/1994 | Gross |
| 5,406,605 | A | 4/1995 | Gross |
| 5,586,157 | A | 12/1996 | Gross et al. |
| 7,253,716 | B2 | 8/2007 | Lovoi et al. |

OTHER PUBLICATIONS

Non-Final Office Action, U.S. Appl. No. 11/298,736, 12 pages, May 11, 2007.
Amendment and Response to Non-Final Office Action, U.S. Appl. No. 11/298,736, 14 pages, Aug. 13, 2007.
Final Office Action, U.S. Appl. No. 11/298,736, 13 pages, Oct. 23, 2007.
Amendment and Response to Final Office Action, U.S. Appl. No. 11/298,736, 9 pages, Dec. 21, 2007.
Final Office Action, U.S. Appl. No. 11/298,736, 15 pages, Jan. 11, 2008.
Amendment and Response to Final Office Action, U.S. Appl. No. 11/298,736, 12 pages, Apr. 11, 2008.
Author Unknown, "Counterfeit Drug Detection", TGA News, TGA Laboratories, Australia, 29, Issue 29, 2 pages, May 1999.
Collon et al., "Development of an AMS Method to Study Oceanic Circulation Characteristics Using Cosmogenic 39Ar", Nuclear Instruments and Methods in Physics Research, B 223-224, pp. 428-434, 2004.
Office Action, U.S. Appl. No. 11/298,736, 21 pages, May 14, 2008.
Gross, "Concentric-Sphere Design for Spacing of Tag-Gas Isotopic Ratios," Nuclear Technology, vol. 45, Sep. 1979, pp. 195-197.
Gross et al., "Barycentric Coordinates Technique for Identification of Simultaneous Fuel Failures with Gas Tagging," Nuclear Science and Engineering, 75, 1980, pp. 1-11.

*Primary Examiner*—Edwyn Labaze
(74) *Attorney, Agent, or Firm*—Dorsey & Whitney LLP (57) ABSTRACT

A method of tagging a manufactured product with a passive tag includes processing a subset of a plurality of unique combinations of at least two axis ratios, where the subset is determinable by a plurality of parameters that define a portion of a coordinate space, to determine a first particular unique combination of the at least two axis ratios. A gas having the determined particular one unique combination of at least two axis ratios is incorporated into the manufactured product. The product to be tagged may be a first product, characterized by a first particular characteristic, and a second product is characterized by a second particular characteristic different from the first particular characteristic. The unique combination of at least two axis ratios is a first unique combination. The plurality of unique combinations of at least two axis ratios is processed to determine a second particular unique combination of the at least two axis ratios, and a gas having the determined second particular unique combination of at least two axis ratios is incorporated into the second product.

20 Claims, 8 Drawing Sheets

SECURE PASSIVE TAGGING SCHEME

CROSS REFERENCE TO RELATED APPLICATIONS

This application is related to co-pending patent application Ser. No. 11/298,736, entitled PASSIVE TAGGING OF PRODUCTS and filed on even date herewith. Co-pending patent application Ser. No. 11/298,736 is incorporated by reference herein in its entirety.

BACKGROUND

Challenges for manufacturing and distribution of expensive pharmaceutical products include counterfeiting and theft. Counterfeiting results in tens of millions of dollars of lost revenues to pharmacy companies at best, and can result in extreme hazards or death to human consumers of the counterfeited medications at worst. The US Food and Drug Administration (FDA) has stated that, in many countries, patients taking prescribed medications have more than a 50% chance that their medications are counterfeit. See the FDA report at http://www.fda.gov/oc/initiatives/counterfeit/report02_04.html. The FDA is requiring by 2007 that drug companies implement a solution to counter drug counterfeiting.

SUMMARY

A method of tagging a manufactured product with a passive tag includes processing a subset of a plurality of unique combinations of at least two axis ratios, where the subset is determinable by a plurality of parameters that define a portion of a coordinate space, to determine a first particular unique combination of the at least two axis ratios. A gas having the determined particular one unique combination of at least two axis ratios is incorporated into the manufactured product.

The product to be tagged may be a first product, characterized by a first particular characteristic, and a second product is characterized by a second particular characteristic different from the first particular characteristic. The unique combination of at least two axis ratios is a first unique combination.

The plurality of unique combinations of at least two axis ratios is processed to determine a second particular unique combination of the at least two axis ratios, and a gas having the determined second particular unique combination of at least two axis ratios is incorporated into the second product.

DETAILED DESCRIPTION

Radio Frequency Identification (RFID) has potential to help reduce counterfeiting and thefts of medications. However, there are limitations to conventional passive and active RFID tags when applied to medications. Passive tags are RFID tags powered solely by the RFID interrogator. The interrogator emits a radio frequency (RF) signal, and the RF signal powers the silicon chip on the tag when it is within range of the RF field. When the power to the silicon chip on the tag meets the minimum voltage threshold to turn on, the silicon chip can then send back information on the same RF wave. The range is usually limited to several meters.

Active tags are RFID tags that have their own power source, so they can receive a weaker signal from the interrogator (i.e., can be further away), and the power source on the tag boosts the return signal. Active tags can have ranges of many tens of hundreds of meters, but typically cost more because of their size and sophistication.

RFID tags for pharmaceutical applications are perhaps better than having no RFID tags, but their value is limited. If the tags are to be intimately integrated with a liquid or solid medication, then the tags should meet stringent FDA purity standards. Passive tags that are not intimately integrated with medication can be separated from the medication, tampered with, switched, or can also be counterfeited. Active RFID tags are similarly limited, and also have finite battery life.

In accordance with examples, a inert noble gas passive tag is provided. The passive tag can be safely integrated with liquid or solid medication, can be made extremely difficult to counterfeit due to mathematical complexity, and is relatively inexpensive to implement.

In particular, medication is tagged with unique isotopic compositions of noble gas tags. (While the discussion herein is with respect to medicine, which is thought to be a very useful application, other products may be tagged.) Each tag comprises a (typically, relatively small) quantity of gas that includes enriched isotopes from inert noble gases. In one example, the inert noble gases include neon, argon, krypton, and xenon. Specific isotopes include He-3, He-4, Ne-18, Ne-19, Ne-20, Ar-36, Ar-38, Ar-40, Kr-76, Kr-78, Kr-80, Xe-120, Xe-124, Xe-128, and Xe-129. These isotopes are naturally occurring and are present in the atmosphere in small quantities. (While not necessarily precluded from being used, other isotopes of these five species are radioactive. There is also one additional noble gas species, radon, that is radioactive.)

These stable noble gas isotopes are chemically inert and biologically benign. Although humans could not live in pure atmospheres of any of the above noble gases (because of absence of oxygen), small quantities have no deleterious effects on humans. Moreover, the quantities that would typically be used are on the order of picoliter and smaller traces.

The noble gas isotopes are present in the atmosphere with precise and known natural-abundance isotopic ratios for any given species. In accordance with examples, unique tag gases are provided using enriched compositions of the stable noble gases. The enriched composition ratios differ in a detectable way from "background" ratios (i.e. those present in the atmosphere).

Noble gas tagging itself is a well-proven technology from decades ago in an entirely different application domain. It is believed to have been conceived in the mid-1970's. See, e.g., Gas Tagging for Failed Fuel Identification in Nuclear Reactors, K. C. Gross, PhD Thesis, U. of Cincinnati (1977). Noble gas tagging was used to tag hundreds of thousands of fuel rods in the 1970s and 1980s for the specific purpose of identifying failed fuel rods in the two US liquid-metal cooled nuclear reactors, EBR-II and FFTF (both now decommissioned). For the nuclear applications, the tag gas was deployed in a gaseous carrier gas, not integrated into a solid/liquid pharmaceutical substance matrix. Another significant difference is that the gas tagging of nuclear fuel rods employed gas tag detection only for leak detection and identification, i.e. the tag gas had to escape from the fuel rods to be of any use. In accordance with the described examples, the tags remaining integrated (in the molecular sense) with the medication substance and, as such, is not used for leak detection as in prior art, but is used for the purpose of authentication of the host substance, a concept not disclosed in the nuclear reactor gas tagging references listed here:

"Improved Gas Tagging and Cover Gas Combination for Identifying"Breached Fuel Elements in Nuclear Reactors," K. C. Gross and M. T. Laug, U.S. Pat. No. 4,495,143 (Jan. 22, 1985).

"Expert System for Identification of Simultaneous and Sequential Fuel Failures with Gas Tagging," K. C. Gross, U.S. Pat. No. 5,333,157 (Jul. 26, 1994).

"Genetic Algorithm Method for Analytical Designs of Gas Tagging Systems," K. C. Gross, U.S. Pat. No. 5,406,605 (Apr. 11, 1995).

In one example, a gas "tag" is a small volume of enriched noble gas isotopes. The tag is represented as a node in a multi-dimensional Cartesian coordinate system. The axes of the coordinate system are isotopic ratios for same-species ratios. Example axis ratios include:

He-3/He-4
Ne-20/Ne-22
Ne-20/Ne-18
Ar-36/Ar-40
Ar-38/Ar-40
Kr-78/Kr-80
Kr-82/Kr-80
Xe-124/Xe-126
Xe-128/Xe-126
Xe-129/Xe-126
Xe-124/Xe-128
Xe-129/Xe-128
Xe-124/Xe-129

For a particular characteristic that is desired to be identified (e.g., a particular combination of medication, manufacturer, batch, date and time of manufacture), a unique tag node is chosen based on a unique combination of the isotopic ratios. A practical consideration is that the chosen tag node, when plotted in an n-dimensional ratio space (where "n" is the number of axes of the coordinate system) should be sufficiently far away from the tag node for a different medicine such that the difference can be resolved by the measurement apparatus and/or method.

For example, a typical detection apparatus is a mass spectrometer. With presently-available mass spectrometers, it is estimated that at least one hundred unique ratios can be defined for any given axis. Thus, for a 2-dimensional tag ratio space, one could define $10^2$ or 100 unique tags. For a thirteen-dimensional tag ratio space, one could define $10^{13}$ (i.e. ten trillion) unique tags resolvable with presently-available mass spectrometers. Thus, for example, not only can every unit of medication have its own unique tag, it is also possible to uniquely tag each batch, for each production facility around the world. Consequently, for example, any unit of medicine may be traced by its passive tag to the exact manufacturer, batch, date, and time of manufacture.

In general, a thus-tagged unit of medicine, whether liquid or solid, should be hermetically sealed. If the medicine is hermetically sealed, it can be authenticated and traced to its origin with a "gas sniffer" (a small noble-gas mass spectrometer). However, even if the unit of medicine is later separated from its container or otherwise unsealed, there will be sufficient noble gas isotopes remaining in the liquid or solid molecular matrix of the unit of medicine for detection and identification by a gas sniffer. Indeed, mass spectrometers available today are able to identify isotopic ratios of xenon in meteorite samples that are millions of years old, even when the total xenon content is on the order of $10^{13}$ ml. The traces of noble gas isotopes that will remain in opened medicine samples will be larger, typically by many orders of magnitude than the traces in the old meteorite samples.

To manufacture the tags for a particular use, isotopically pure quantities of all possible isotopes (e.g., fifteen unique isotopes in the list above) would not be required. In one example, a finite number of "feed gas" mixtures is utilized. Each feed gas mixture comprises anywhere from two to fifteen of the stable noble gas isotopes. If the composition of each feed gas is kept reasonably secure and yet further, the possible constituent tag nodes are defined to be a "secret" subset of tag nodes, then this provides protection against counterfeiting (although a sufficiently motivated counterfeiter could determine the tag composition for a particular authentic medication sample and counterfeit medication using this same tag composition).

Figure 1:
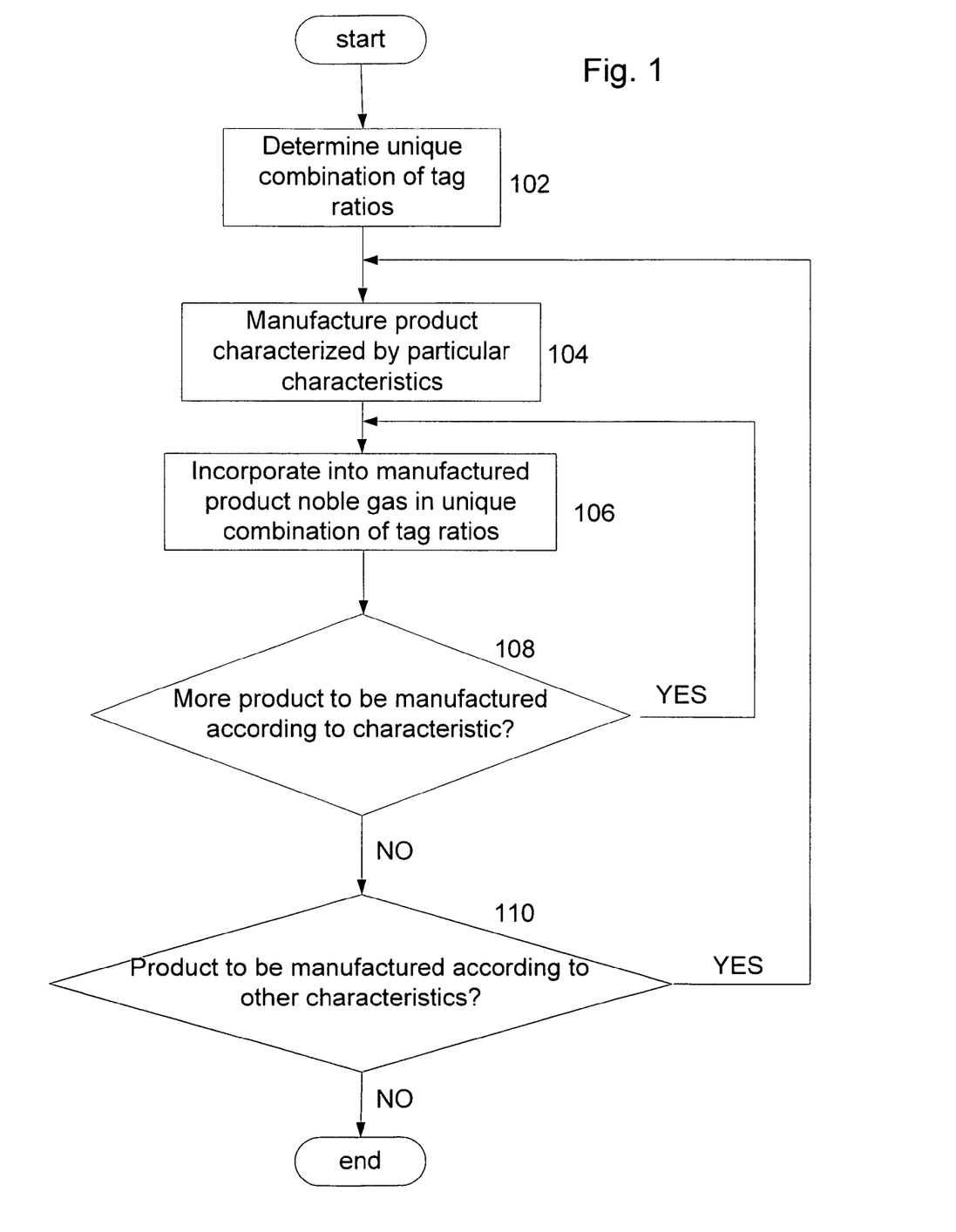
FIG. 1 is a flowchart broadly illustrating a method of manufacturing products having incorporated therein noble gas in a unique combination of tag ratios.

FIG. 1 illustrates steps of a method 100 to tag products. At step 102, a unique combination of axis ratios is determined, to correspond to particular characteristics of a product or of a group of products. The group is defined merely as products having particular common characteristics which are desired to later verify. Thus, for example, the group may be medication of a certain type and produced at a particular manufacturing facility in a particular batch. Broadly speaking, grouping of products is well-known. For example, in 2001, the National Coordinating Council for Medication Error Reporting and Prevention proposed that each medication package include a bar code that indicates a National Drug Code (NDC), a lot/control/batch number and an expiration date. This is just one example of unique characteristics which are desired later to verify.

At step 104, product is manufactured characterized by the unique characteristics to which the unique combination of axis ratios corresponds. Thus, for example, a particular batch of a particular medication (identifiable by a particular NDC), and having a particular expiration date, may be the product that is manufactured. At step 106, a gas having the unique combination of axis ratios determined at step 102 is incorporated into the manufactured product. For example, the gas may be bubbled into a liquid medication. For a solid medication, it may be more appropriate to introduce the gas at some stage of the manufacture (e.g., by an "evacuate and backfill" procedure) such that the noble gas mixture diffuses into the lattice structure of the manufactured product. As discussed above, it may be preferable for the product having the gas incorporated therein to be hermetically sealed.

At step 108, it is determined if there is more product to be manufactured according to the particular characteristic. If so, then processing returns to step 104. Otherwise, processing goes to step 110, where it is determined if a different product is to be manufactured, according to another particular characteristic. If so, then processing returns to step 102, for the different product to be manufactured. Otherwise, processing ends at step 112.

Figure 2:
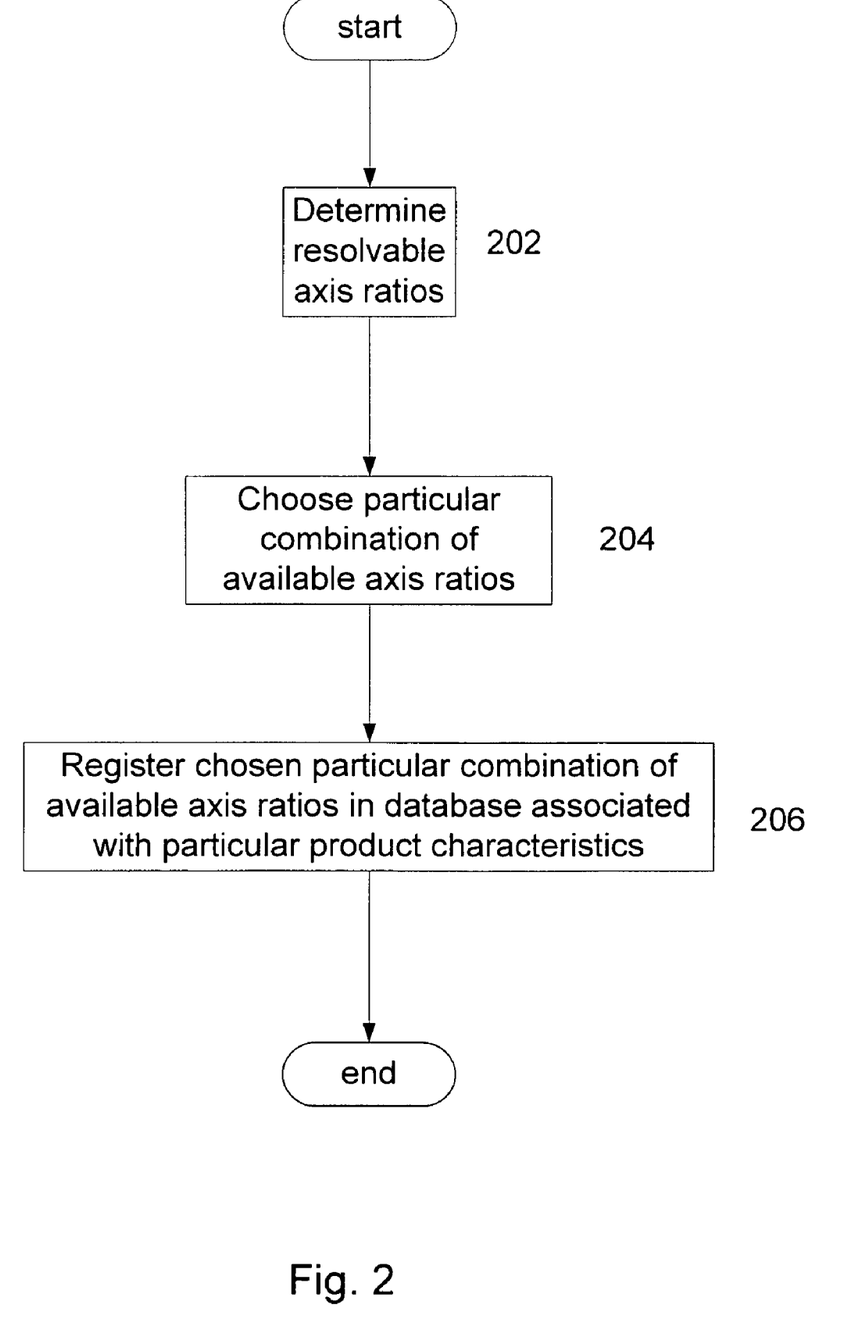
FIG. 2 is a flowchart illustrating a method of choosing the combination of tag ratios for the gas.

We now turn to FIG. 2, which is a flowchart illustrating a process 200 to determine the unique combination of axis ratios. At step 202, a set of available axis ratios is determined.

For example, the available axis ratios may be those that are resolvable. This issue of resolvability is discussed above with respect to presently-available mass spectrometers. The level of resolvability depends on the instrumentation available to detect the ratios as the gas is incorporated into a product. For example, resolvability may improve beyond that achievable with presently-available mass spectrometers or other instrumentation.

At step 204, a particular combination of the available axis ratios is chosen. At step 206, the chosen combination of available axis ratios is registered with a database in association with the particular product characteristics. In this way, when the particular combination of axis ratios is incorporated into a product and is later detected, the particular product characteristics can be determined (with reference to the database).

We now discuss examples of using the tagging method described above in a manner so as to minimize the possibility of counterfeiting a product, such as a medicine (or, put another way, to enhance the ease with which the authenticity of a product may be detected). Specifically, the examples allow for a choice of tags whose ratios fall within a well-defined portion of an n-dimensional space.

Figure 3:
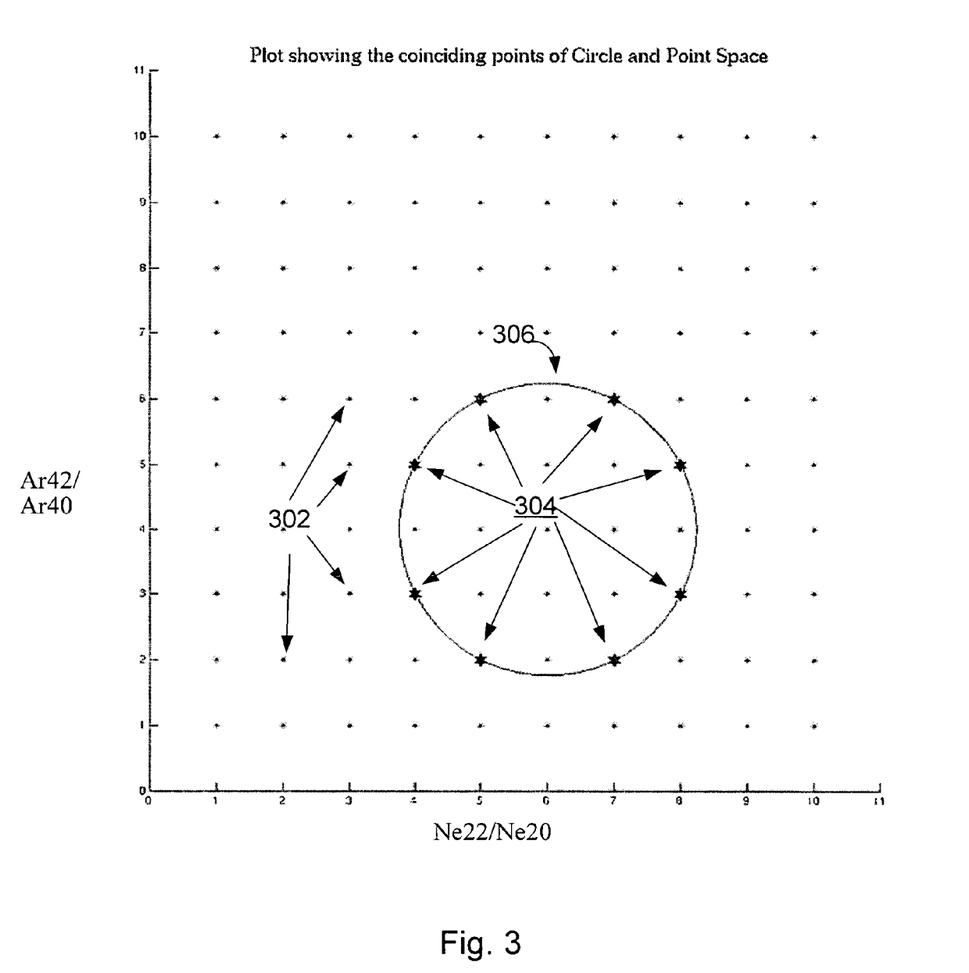
FIG. 3 illustrates a simple two-dimensional example for determining a subset of possible combinations that is defined parametrically.

An analytical-geometry model for working with unique gas tags includes plotting the isotopic ratios of the gas tags in a Cartesian coordinate space. Referring to FIG. 3, as a simple example, if one were to have a tag containing only neon and argon, one could use a two-dimensional Cartesian coordinate space to plot the ratio of Ne22/Ne20 on the dimensionless X axis of the two-dimensional space and Ar42/Ar40 on the dimensionless Y axis of the two-dimensional space. By systematically varying the isotopic composition of the Ne and Ar while blending the tags, one could generate a matrix of "tag nodes."

A practical limitation may be that, if the tag nodes are squeezed together, it may not be practically possible to resolve adjacent nodes. This is a limitation of the detection equipment (e.g., a mass spectrometer). FIG. 3 illustrates a ten by ten matrix of tag nodes 302 but, in practice, mass spectrometers are very accurate and, thus, at least hundreds of values in each dimension are feasible.

If a counterfeiter were to open one bottle of pills and measure the tag gas composition with a mass spectrometer, that person could buy some raw neon and argon gasses and counterfeit the tag for that one bottle of pills. Moreover, with the tag nodes 302 spaced in a rectangular grid such as shown in FIG. 3, if the counterfeiter were to get several bottles and detect the tag compositions, it is possible that the counterfeiter could learn the grid spacing algorithm and produce a large batch of counterfeit tags. However, to make counterfeiting more difficult, the choice of possible tag nodes can be designated to be tag nodes 304 that fall on a circle 306, as shown in FIG. 3.

Encryption parameters that would be kept secret are the center and radius of the node circle 306 in a two-dimensional space, such that the node circle 306 is an "encryption circle." If these encryption parameters are kept secret, one would need to get three bottles of pills tagged with ratios whose nodes fall on the same encryption circle. However, there can be multiple encryption circles in the same plane, so that if a counterfeiter were to analyze three random bottles of medicine and identify three nodes in the plane, the counterfeiter would still not be certain to have identified a legitimate encryption circle.

Nevertheless, in the example where there are one hundred feasible tag nodes in a two-dimensional plane, it is possible that one could analyze three bottles at random and get lucky to identify a proper "encryption circle." For this simple example with just a two dimensional tagging system, the odds of picking three points at random and learning the encryption circle parameters are about 0.04%. In some situations, this probability is too high to be acceptable.

Figure 4A:
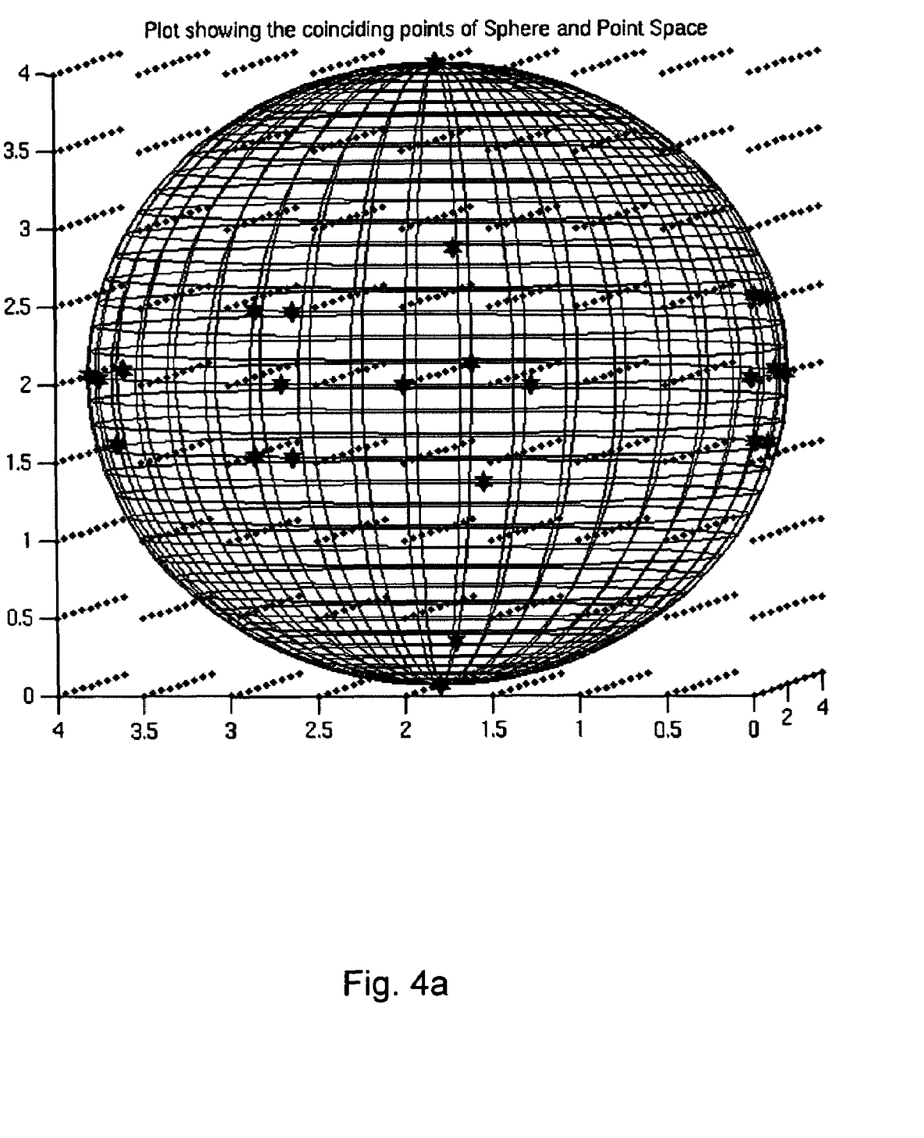
FIGS. 4a, 4b and 4c illustrate a more complex, multidimensional example for determining parameters of a subset of possible combinations.
Figure 4B:
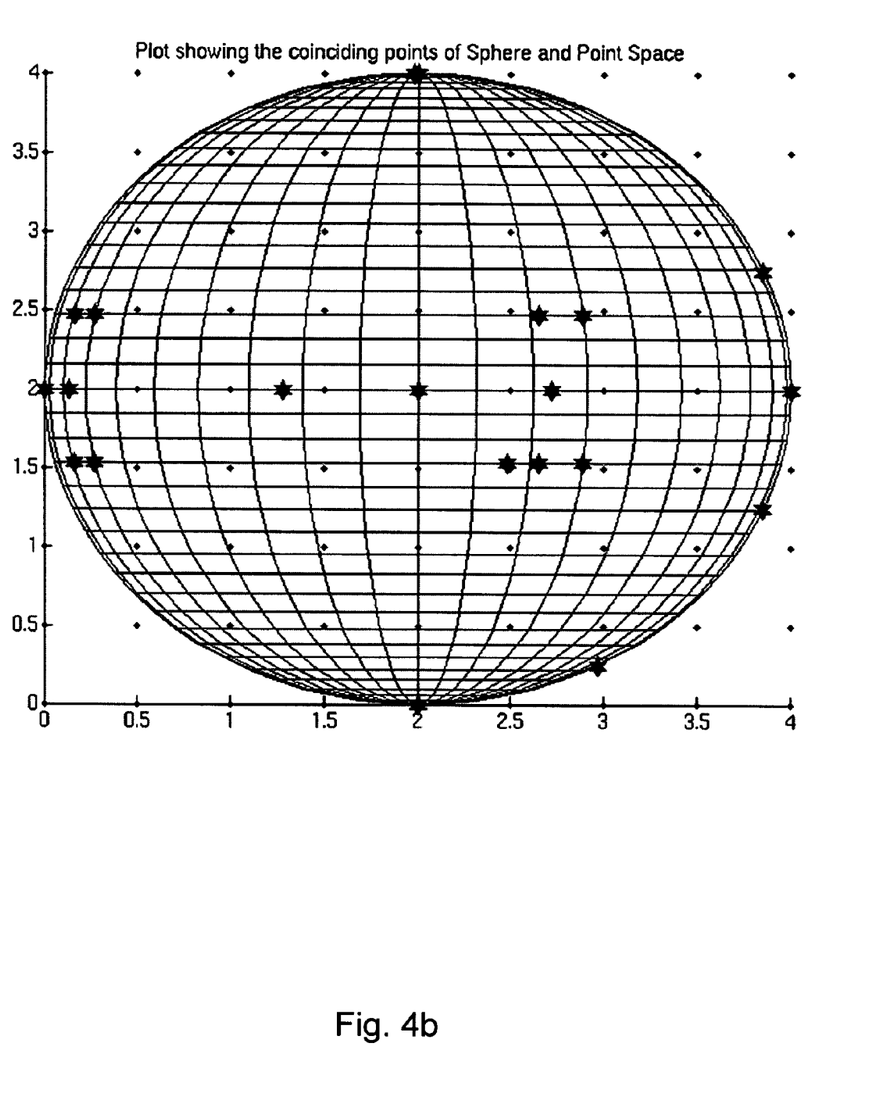
Figure 4C:
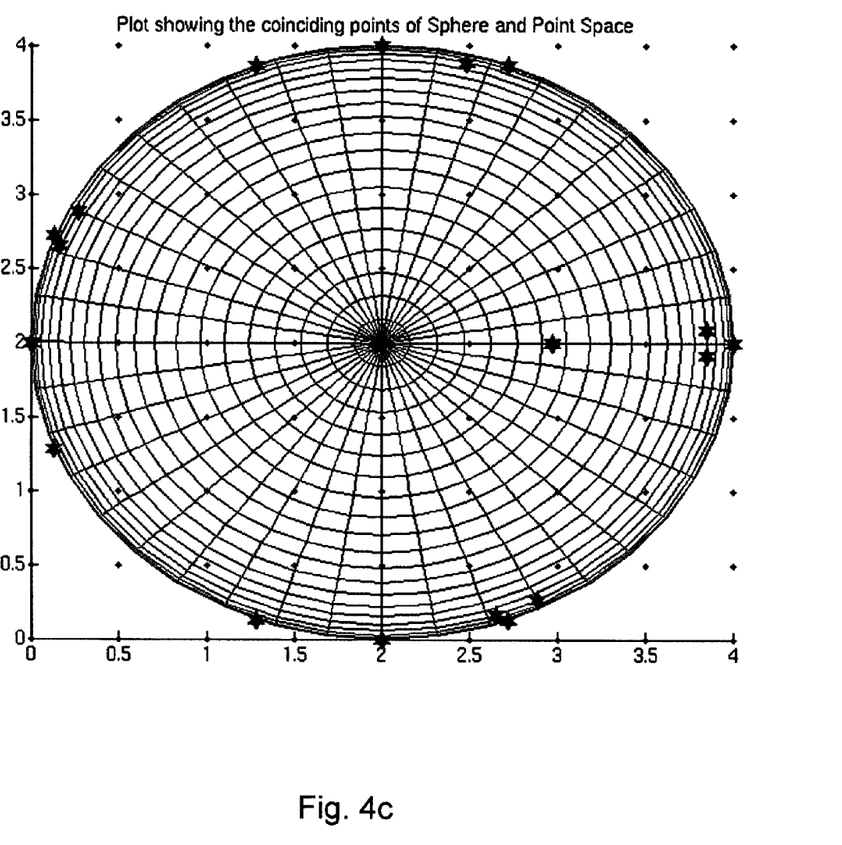

To reduce the probability, two additional isotopes can be added to the mixture, with the ratio of the two additional isotopes being plotted in a third dimension. This results in an "encryption sphere" in three-dimensional space. FIGS. 4a, 4b and 4c illustrate an example encryption sphere from various views. With this arrangement, if a counterfeiter tries to identify the center and radius of the encryption sphere, it would be necessary to get and analyze four or more bottles of medicine with ratios whose nodes fall on the same encryption sphere. In three-dimensional space, there are at least one thousand unique feasible tag nodes and multiple possible encryption spheres. The odds of randomly picking four bottles of medicine and learning the encryption sphere parameters are about three out of ten million.

If a fourth ratio is added, the encryption shape may be a hypersphere in four-dimensional space. More ratios may be added. For a complete noble gas tagging system with thirteen possible distinct tag ratios, a counterfeiter would have to obtain fourteen tag node coordinates from the same encryption hypersphere, out over ten trillion possible tag nodes, in order to learn the encryption parameters to mass produce counterfeited pharmaceuticals. The probability of being able to do so is vanishingly small.

Figure 5:
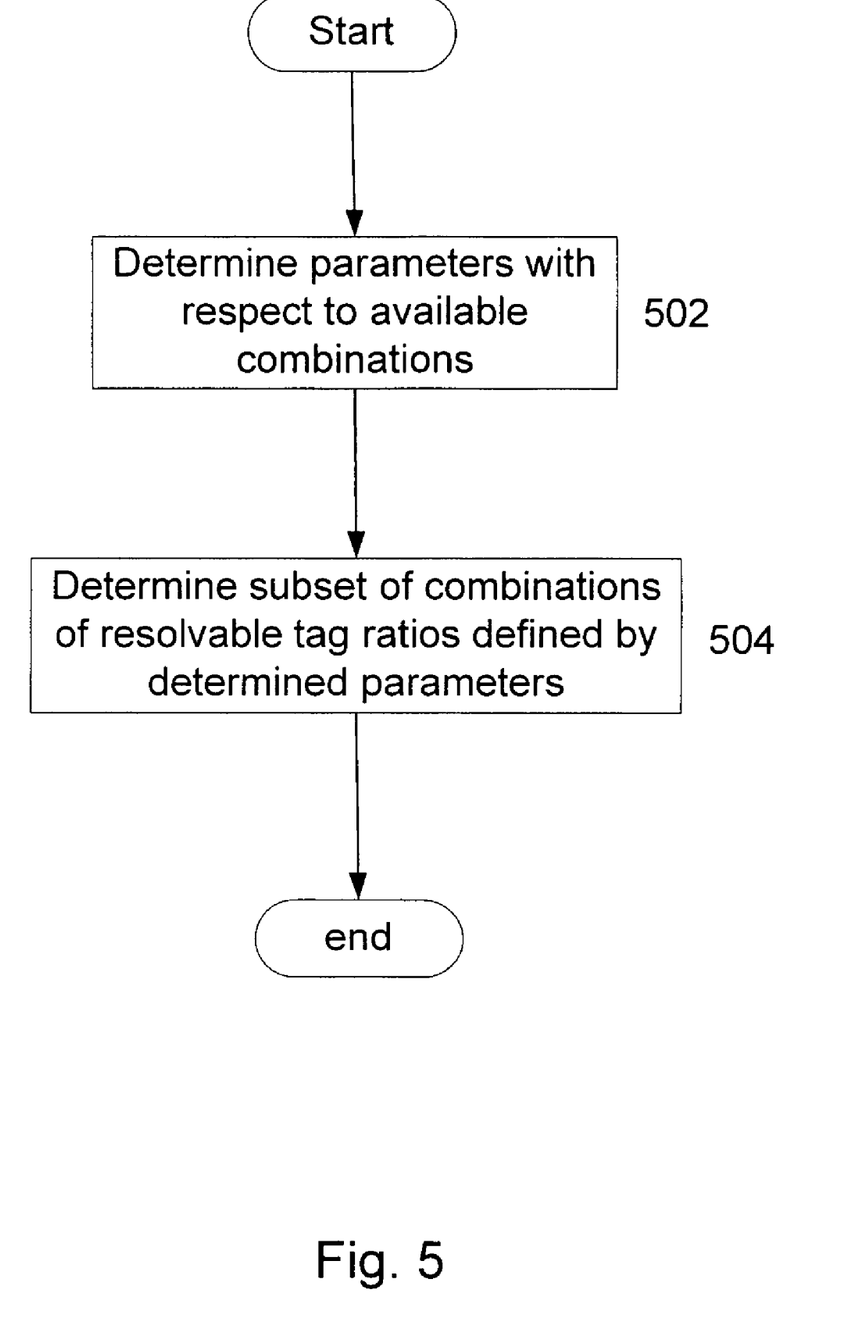
FIG. 5 is a flowchart illustrating a general method according to the FIG. 3 and FIGS. 4a, 4b and 4c examples.

FIG. 5 illustrates a generalized method to determine an acceptable subset of combinations of tag ratios. At step 502, parameters are determined with respect to available combinations. For example, using the simple FIG. 3 two-dimensional case, such parameters may include a center and radius associated with the circle 306. The parameters are preferably held securely such that those who attempt counterfeiting cannot access them. At step 504, it is determined what are the subset of combinations of resolvable tag ratios that are defined by the determined parameters. Again using the simple FIG. 3 two-dimensional case, the subset of combinations includes the points 304.

Figure 6:
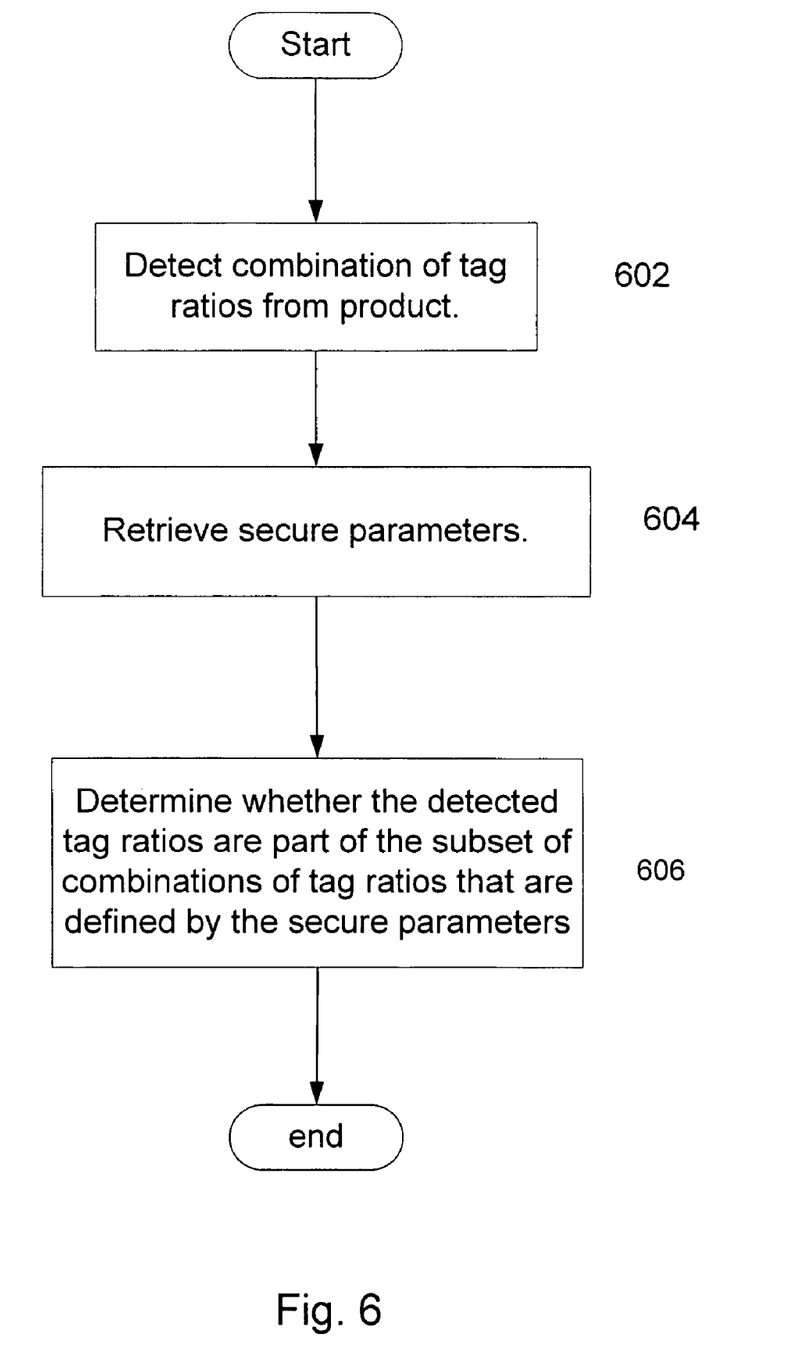
FIG. 6 is a flowchart illustrating a method to determine if a product is authentic.

On the other hand, a method is discussed with reference to FIG. 6 to determine (with some confidence) if a product is authentic. At step 602, a combination of tag ratios is detected from the product. Then, at step 604, secure parameters corresponding to the nominal product characteristics (e.g., product, manufacturer, lot number) are retrieved. At step 606, it is determined, based on the secure parameters, whether the detected tag ratios are part of the subset of combinations of tag ratios that are defined by the secure parameters. Thus, for example, the secure parameters define a subportion of a "space" of combinations and, if the detected combination of tag ratios are within the subportion, then the product is not counterfeit (or, at least, there is a high probability that the producer of the product had access to the secure parameters).

What is claimed is:

1. A method of tagging a manufactured product with a passive tag, comprising:

processing a subset of a plurality of unique combinations of at least two axis ratios, wherein the subset is determinable by a plurality of parameters that define a portion of a coordinate space, to determine a first particular unique combination of the at least two axis ratios;

incorporating into the manufactured product a gas having the determined particular one unique combination of at least two axis ratios by integrating the gas into a solid or liquid matrix of the product.

2. The method of claim 1, wherein:
each isotopic ratio is a ratio of species selected from the group consisting of isotopes of He, Ne, Ar, Kr and Xe.

3. The method of claim 1, further comprising hermetically sealing the manufactured product with the gas incorporated therein.

4. A method of tagging a manufactured product with a passive tag, comprising:
processing a subset of a plurality of unique combinations of at least two axis ratios, wherein the subset is determinable by a plurality of parameters that define a portion of a coordinate space, to determine a first particular unique combination of the at least two axis ratios;
incorporating into the manufactured product a gas having the determined particular one unique combination of at least two axis ratios, wherein:
the product to be tagged is a first product, characterized by a first particular characteristic;
a second product is characterized by a second particular characteristic different from the first particular characteristic; and
the unique combination of at least two axis ratios is a first unique combination;
the method further comprises: processing the subset of the plurality of at least two axis ratios to determine a second particular unique combination of the at least two axis ratios; and
incorporating into the second manufactured product a gas having the determined second particular unique combination of at least two axis ratios.

5. The method of claim 4, wherein:
a difference between the axis ratios of the plurality of unique combinations of at least two axis ratios is resolvable by a mass spectrometer.

6. The method of claim 4, further comprising:
maintaining a record of the determined unique combinations relative to the first and second manufactured product.

7. The method of claim 6, wherein:
maintaining a record of the determined unique combinations relative to the first and second manufactured product includes correlating the determined unique combinations to characteristics related to manufacturing the first and second manufactured product.

8. The method of claim 7, wherein:
the characteristics related to manufacturing the first and second manufactured product include an identification of the product, a manufacturer, and a batch, date and time of manufacture.

9. The method of claim 4, further comprising hermetically sealing at least one of the first and second manufactured products with the respective gas incorporated therein.

10. The method of claim 4, wherein at least one of the gases is incorporated into the respective manufactured product by integrating the at least one of the gases into a solid or liquid matrix of the respective manufactured product.

11. A method of determining whether a product is authentic, comprising:
detecting a combination of at least two axis ratios incorporated into the product, wherein each axis ratio is an isotopic ratio for a same-species ratio of enriched noble gas isotopes;
determining whether the detected combination is part of a subset of at least two axis ratios determined by a plurality of secure parameters that define a portion of a coordinate space; and
identifying the product as authentic when the detected combination is part of the subset.

12. The method of claim 11, wherein:
the detecting step includes using a mass spectrometer.

13. The method of claim 11, wherein:
the determining step includes accessing the plurality of secure parameters.

14. The method of claim 13, wherein:
the plurality of secure parameters correlate to an indication of product characteristics.

15. The method of claim 11, wherein the combination of at least two axis ratios to be detected is incorporated into the product by integrating the enriched noble gas isotopes into a solid or liquid matrix of the product.

16. The method of claim 11, wherein the product is hermetically sealed with the combination of at least two axis ratios to be detected incorporated therein.

17. A manufactured product having incorporated therein a gas having a combination of at least two axis ratios, wherein:
each axis ratio is an isotopic ratio for a same-species ratio of enriched noble gas isotopes; and
the combination of at least two axis ratios does not correspond to a subset of at least two axis ratios determined by a plurality of secure parameters that define a portion of a coordinate space, wherein the manufactured product is a manufactured pharmaceutical product.

18. The product of claim 17, wherein the manufactured pharmaceutical product is hermetically sealed with the gas incorporated therein.

19. The product of claim 17, wherein the gas is integrated into a solid or liquid matrix of the manufactured pharmaceutical product.

20. The product of claim 19, wherein the manufactured pharmaceutical product is hermetically sealed with the gas integrated therein.

* * * * *